United States Patent [19]

Sweat et al.

[11] 4,230,203

[45] Oct. 28, 1980

[54] TREE CLIMBING APPARATUS

[76] Inventors: George B. Sweat, 4121 Aldington Dr., Jacksonville, Fla. 32210; Alvin E. Warren, 1115 Lane Ave., North, Jacksonville, Fla. 32205

[21] Appl. No.: 901,503

[22] Filed: May 1, 1978

[51] Int. Cl.² ............... A63B 27/00; A45F 3/26
[52] U.S. Cl. .......................... 182/134; 182/187
[58] Field of Search ............... 182/187, 135, 134, 136

[56] References Cited

U.S. PATENT DOCUMENTS

| | | | |
|---|---|---|---|
| 3,485,320 | 12/1969 | Jones | 182/187 |
| 3,856,111 | 12/1974 | Baker | 182/135 |

OTHER PUBLICATIONS

Rifleman Tree Climber, Warren & Sweat Mfg. Co., Jacksonville, Fla.

Primary Examiner—Reinaldo P. Machado

[57] ABSTRACT

A tree climbing apparatus comprising a lower support and an upper support wherein each support includes a platform member and brace members in the form of spaced front and back blades with a pair of spaced tubular members connecting the back blade to the platform member. The lower platform includes a foot receiving area designed to cooperate with foot engageable elements to secure an occupant's feet to the platform and a foot support area located rearwardly of the foot receiving area. The upper platform comprises a seat designed to be disposed closely adjacent to the tree such that when the occupant is disposed on the seat with his feet engaged with the foot engageable elements of the lower platform, the occupant's knees are spaced apart straddling the tree. Additionally, when the brace members of the upper and lower supports are supportably engaged with the tree, the lower platform is substantially parallel to the seat of the upper support and the pairs of tubular members of the upper and lower supports are substantially parallel. The foot support area will be displaced further away from the tree than the seat when the upper and lower supports are supportably engaged with the tree.

13 Claims, 11 Drawing Figures

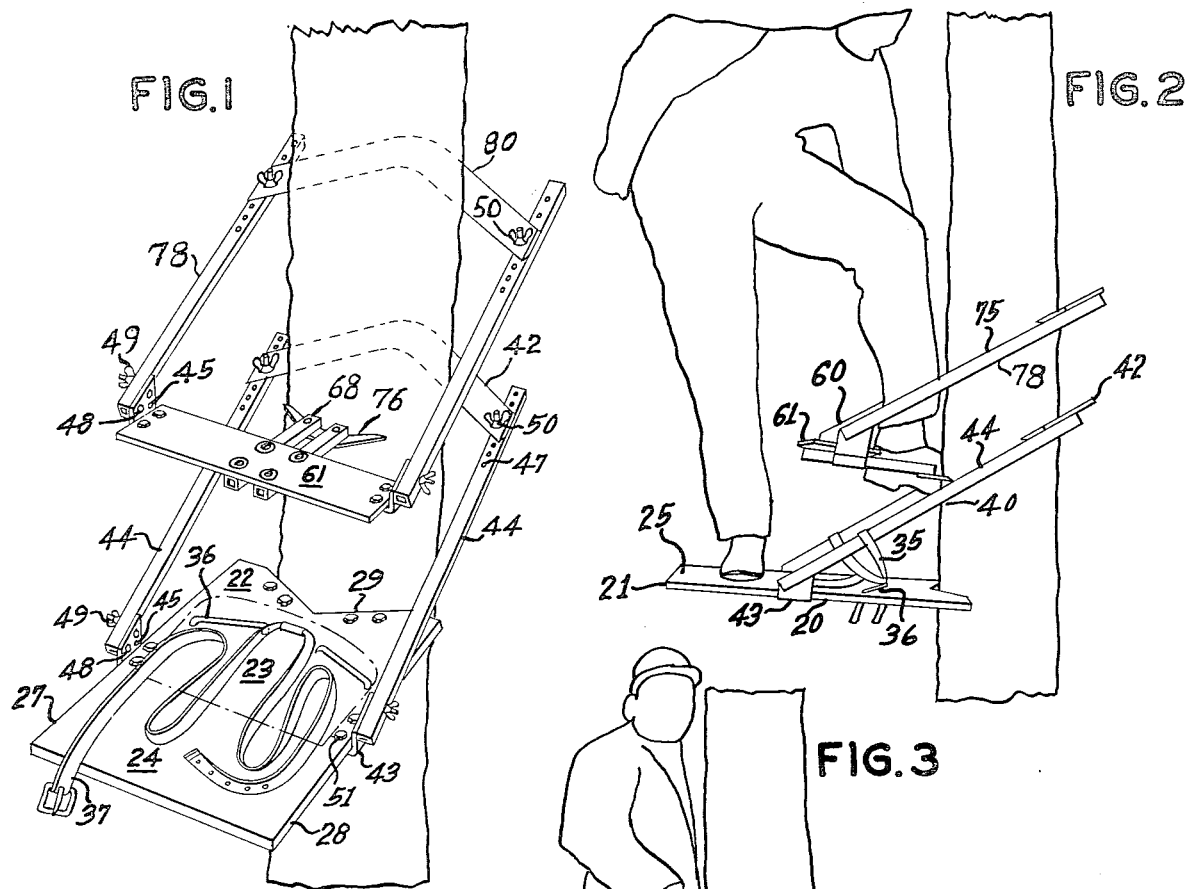
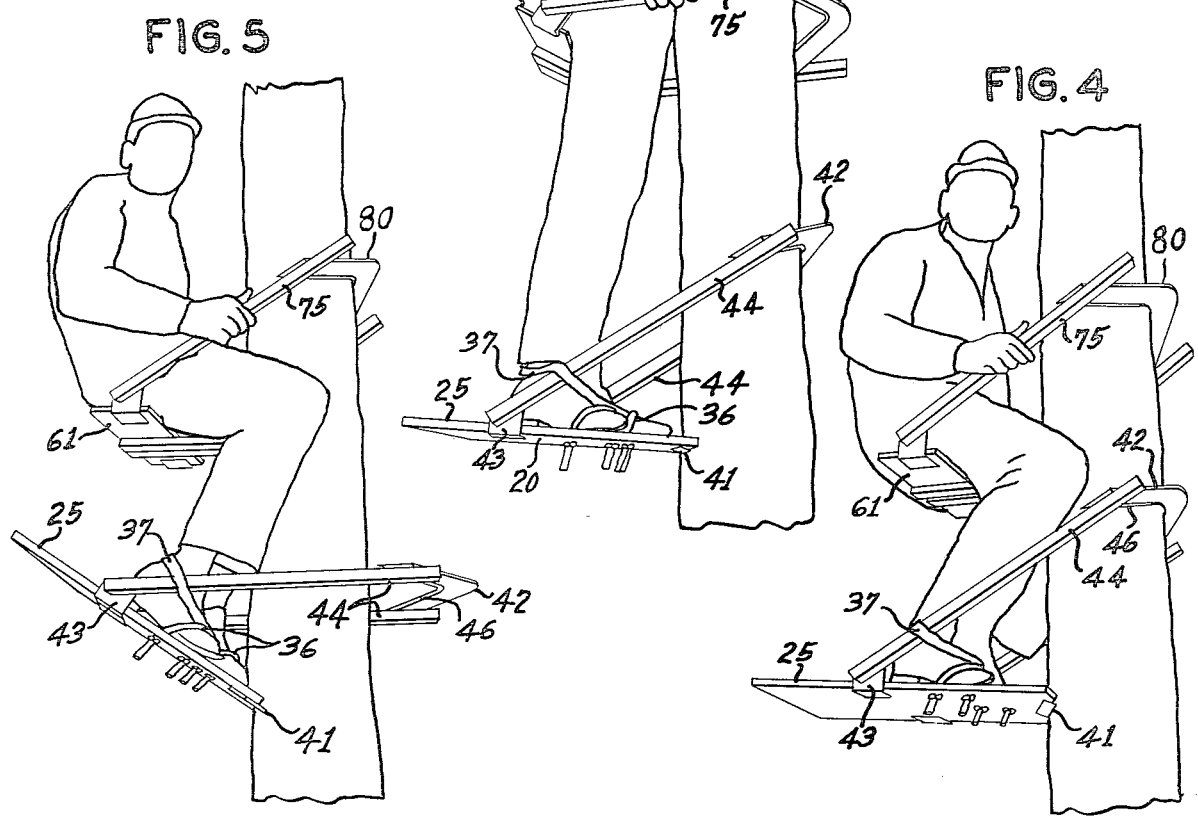

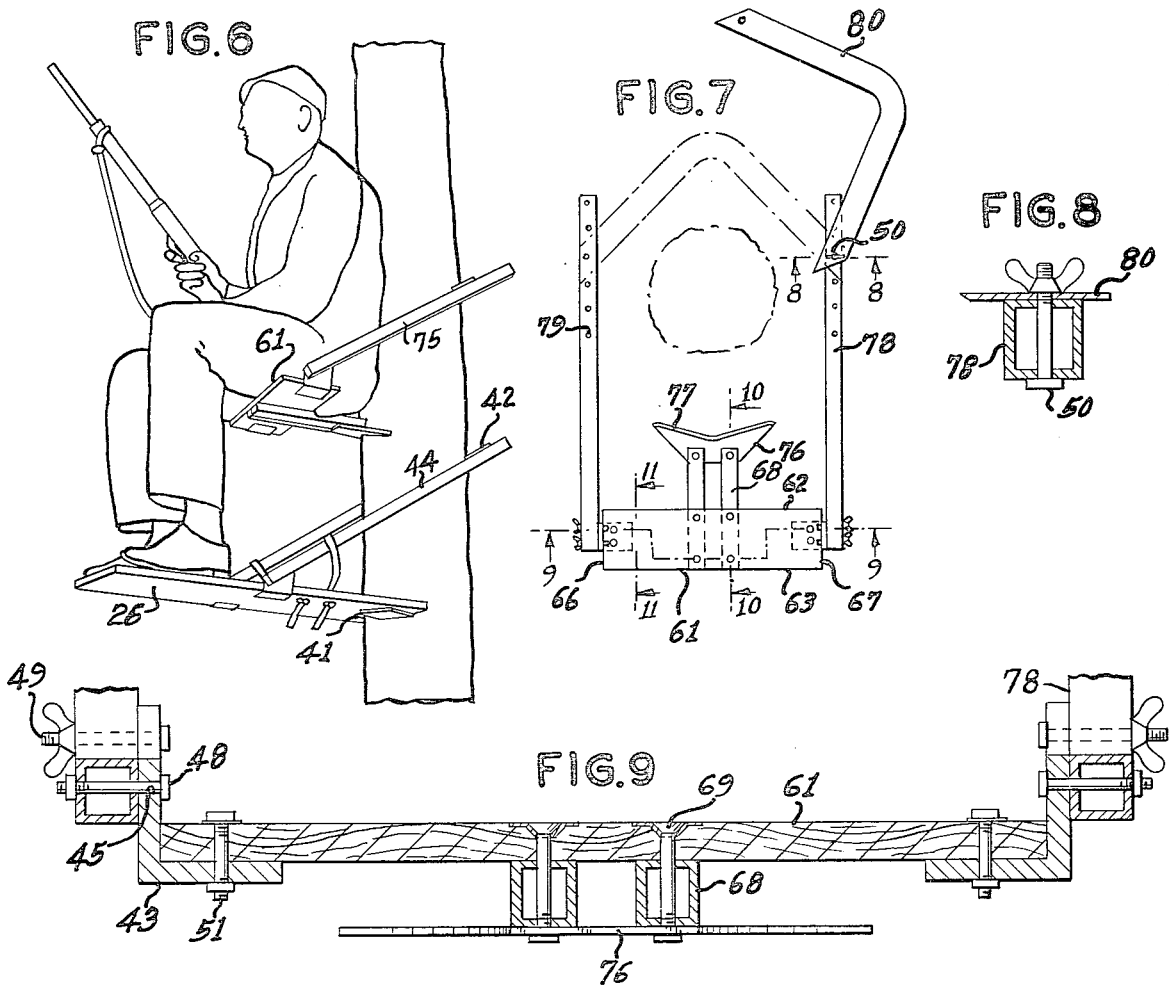

TREE CLIMBING APPARATUS

BACKGROUND OF THE INVENTION

(1) FIELD OF THE INVENTION

The present invention relates to a pole or tree climbing apparatus suited for use by linemen, woodsmen, hunters and other sportsmen which is of relatively simple construction and may be easily assembled or disassembled for convenient use, and permits the user to climb primarily by only using his legs, or used even by a woman or a child.

Hunters and other sportsmen are often required to remain motionless while awaiting game to pass within range. Additionally, comfortable rests are desirable when natural resting locations are covered with snow or water. Accordingly, this invention also relates to a comfortable rest which can be employed irrespective of the condition of the ground.

(2) DESCRIPTION OF THE PRIOR ART

Tree climbing apparatus in the form of portable platforms and seats are well known and are generally disclosed in U.S. Pat. Nos. 3,460,649, 3,485,320, 3,493,080, 3,817,350, 3,856,111, 3,949,835, 3,955,645, 3,960,240 and 3,991,853. A few of the devices are merely seats or platforms which are secured to the tree trunk by means of fastening elements such as chains, straps or blades. However, one shortcoming of these devices is raising them up the tree and securing them in place after the desired position is reached. Also, the devices are somewhat dangerous if not properly secured to the tree. The apparatus disclosed in U.S. Pat. Nos. 3,485,320, 3,856,111, 3,955,645, and 3,960,240 relate to tree climbing platforms designed to be cooperatively used with an additional tree climbing accessory. However, proper use of these devices requires a great degree of skill, coordination or strength or a combination thereof, with dangerous consequences if the devices are improperly operated.

A prior tree climbing device has been sold by Warren and Sweat Mfg. Co. under the name "Rifleman Tree Climber". Although the device comprises dual support elements, the lower foot rest is light and relatively small to only accomodate the occupant's feet. Also, the seat support of this device is designed to be displaced remote from the tree with a back support permitting the occupant to lean away from the tree. When the dual support elements, the foot rest and seat support, are disposed in a tree engaging position, the foot rest which is designed for a relaxed and comfortable foot condition, is inclined with respect to the relatively larger seat support. Also the brace means, consisting of spaced front and back blades with a pair of spaced tubular members connecting the back blade to a support, of the upper and lower supports are designed to be inclined to each other.

The present portable device is designed to be relatively safe and easy to operate with the occupant safely positioned adjacent to the tree during the operable sitting and standing modes of movement which accompany ascent and descent of the tree. Additionally, the device of the present invention allows the occupant to sit with his back to the tree and his feet supported on a lower platform. Upon reaching a desired elevation the foot platform, which is substantially horizontally supported by brace members, may be used as a free standing support by an occupant with the seat platform rotated to misalign the seat platform to position same out of the way of the foot platform or the same may be used as a gun rest or the like. Thus, the occupant is permitted to have a substantially unrestricted freedom of movement while supported on the lower foot platform.

SUMMARY OF THE INVENTION

Accordingly, one aspect of the present invention is the provision of a tree climbing apparatus for an occupant wherein the occupant's legs furnish the primary or sole power to move the occupant up the tree. The tree climbing apparatus generally comprises a lower support and an upper support. The lower support includes a foot platform; platform brace means connected to the foot platform and selectively engageable with the tree by the weight of the occupant supported thereon, wherein the platform brace means is disengageable from the tree when the occupant tilts the lower support upwardly; and foot engageable means attached to the top surface of the platform adjacent a front end portion for firmly engaging the occupant's feet to allow the occupant to raise or lower the foot platform by lifting his legs to disengage the platform brace means and lowering his legs to re-engage the platform brace means with the tree. The upper support includes a seat on which an occupant sits facing the tree with his knees spaced apart and straddling the tree as his legs are lifted to disengage the platform brace means and lowered to re-engage the platform brace means with the tree, and seat brace means connected to the seat and selectively engageable with the tree by the weight of the occupant supported thereon, the upper support brace means being disengageable from the tree when the occupant tilts the upper support upwardly. The seat is disposed above the foot platform substantially above the foot engageable means when the platform brace means and the upper support brace means are disposed in weight bearing relationship on the tree trunk.

Another aspect of this invention relates to a platform brace means which includes a first front blade means connected to the foot platform for engaging the front of the tree, a first back blade means for engaging the back of the tree, and a first connecting means attaching the first back blade means to the foot platform. Similarly, the seat brace means includes a second front blade means connected to the seat for engaging the front of the tree, a second back blade means for engaging the back of the tree, and a second connecting means attaching the second blade means to the seat.

An additional aspect of this invention, which occurs when the platform brace means and the seat brace means are disposed in weight bearing relationship on the tree trunk, is that the foot platform is substantially parallel to the seat and the platform brace means is substantially parallel to the seat brace means.

A further aspect of this invention relates to a foot platform provided with a foot support area disposed rearwardly of the foot engageable means for permitting the occupant to stand thereon. Also, the foot platform is provided with a foot receiving area cooperating with the foot engageable means to secure the occupant's feet thereto with the distance from the first front blade to a rear portion of the foot receiving area being substantially equal to the distance from the second front blade to a rear portion of the seat.

Accordingly, it is a general object of the present invention to provide an improved portable tree climbing apparatus for attaching to a tree or the like.

It is a particular object of the present invention to provide a lightweight tree climbing apparatus having a lower support and an upper support which include brace means for securely positioning the supports at selected elevations on the tree.

A further particular object of the present invention is to provide an apparatus that can be quickly, but unfailingly, secured to trees or like members irrespective of their size or inclination.

A specific object is the provision of an improved foot and seat platform combination for climbing trees by the sole lifting forces of the legs to cause the user to ascend or descend, the user's arms being employed to only move the seat platform.

Another specific object is to provide a tree climbing apparatus with greater versatility of uses and with greater overall acceptability by various persons of unequal tree climbing abilities and/or handicaps.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a top perspective view of the tree climbing apparatus of this invention engaged with a tree trunk;

FIG. 2 is a side perspective view of the apparatus in operative engagement with the tree with the occupant supported on the foot platform;

FIG. 3 is a side perspective view of the apparatus with the foot platform engaged with the tree and the seat support disengaged from the tree;

FIG. 4 is a side perspective view of the apparatus with the foot platform and seat support operatively engaged with a tree;

FIG. 5 is a side perspective view of the apparatus with the foot platform disengaged from the tree when the seat support is engaged with the tree;

FIG. 6 is a side perspective view of the apparatus in operative engagement with the tree with the occupant seated on the seat support and facing outwardly therefrom;

FIG. 7 is a top plan view of the seat support of the tree climbing apparatus;

FIG. 8 is a cross-sectional view thereof taken along line 8—8 of FIG. 7;

FIG. 9 is a cross-sectional view thereof taken along line 9—9 of FIG. 7;

FIG. 10 is a cross-sectional view thereof taken along line 10—10 of FIG. 7; and

FIG. 11 is a cross-sectional view thereof taken along line 11—11 of FIG. 7.

DESCRIPTION OF THE PREFERRED EMBODIMENT

Referring now more particularly to the drawings, the complete tree climbing apparatus comprises a pair of separate but cooperative support devices 20 and 60 which are positionable about a tree trunk, a pole or a similar elongated cylindrical upright member. The cooperative support devices 20 and 60 are useful not only in ascending or descending a tree or pole but also function as a supporting apparatus or rest for the hunter, sportsman, tree surgeon, lineman or the like once the desired height on the tree or pole has been reached.

The lower support 20 includes a substantially rectangular foot platform 21 and a platform brace means 40 connected to the foot platform 21 and selectively engageable with the tree when the weight of the occupant is supported thereon.

As shown in FIG. 1, the foot platform is generally rectangular having a front end portion 22, an intermediate foot receiving area 23 generally shown by broken lines in FIG. 1 and a rear foot support area 24 located rearwardly of the foot receiving area adjacent a rear end portion of the foot platform. Additionally, the foot platform includes top and bottom surfaces 25 and 26, respectively, and side edges 27 and 28.

The front end portion 22 of the platform 21 includes a V-shaped notch 29 adapted to receive a V-shaped first front blade means 41 which is securely attached to the bottom surface of the platform by a plurality of fasteners. The inner edge of the first front blade means 41, which in the preferred illustrated embodiment comprises a pair of spaced blades secured to the legs of the V-shaped notch, is sharpened so as to selectively bite or cut into the tree when the platform is engaged therewith.

Foot engageable means, generally represented by reference numeral 35, extend from the top surface 25 generally within the foot receiving area 23 for firmly engaging an occupant's feet and removably securing the occupant's feet to the foot receiving area to allow the occupant to raise or lower the foot platform by lifting and lowering of his legs to respectively disengage and re-engage the blade arrangement 41 and platform 21 with the tree. The foot engageable means includes a pair of loops 36 affixed to the bottom surface 26, which pass through holes in the platform and extend from the top surface allowing the occupant to slip the toes of the shoes thereunder. Additionally, the foot engageable means includes a strap means 37 secured to the top surface 25 and adapted to pass around the heel of shoes, as generally shown in FIGS. 3-5, wherein the end portions of the strap means are constructed to be adjustably connected together in belt and buckle fashion.

Platform brace means, generally represented by reference numeral 40, comprising the first front blade means 41, a first back blade means and a first connecting means are connected to the foot platform and designed to cooperatively engage or cut into the tree as the weight of the occupant is supported on the foot platform 21. The connecting means adjustably spaces the back blade means, which comprises a back blade 42, from the foot platform, and such connecting means includes bracket means in the form of a pair of spaced angle irons 43 and elongated spacer means in the form of a pair of space elongated tubular members 44. Secured to the side edges 27 and 28 of the foot platform, generally adjacent the foot receiving area, the angle irons have vertical flanges provided with a triangular arrangement of connection holes 45, generally shown in FIG. 1 and more particularly illustrated in the cross-sectional view of seat support in FIG. 11. Pivot means 48 which pass through respective rearward holes of the connection holes 45 pivotally secure end portions of a pair of tubular members 44 to the angle irons 43. The pair of tubular members can be angularly positioned relative to the foot platform by inserting removable fasteners 49 through the tubular members and a set of corresponding holes on the vertical flanges of the angle irons, as is generally shown in FIGS. 1-6 and more particularly applied to the seat support in FIG. 11. In facilitating easy transportation and storage, the pair of tubular members 44 can be positioned substantially parallel with the foot platform. When the tree climbing mode is selected, the tubular members are designed to have an angular relationship with the foot platform. As a result of the varying, non-uniform cross-sectional dimensions of tree trunks and poles, the structural design of the lower support and the anatomical and physiological nature of an occupant, a selected angular relationship between the tubular members and the platform of within a range of 25 to 45 degrees and preferably about 35 degrees will permit a relatively easy and efficient disengagement and re-engagement of the lower support without unduly tiring the occupant.

Having a V-shaped configuration, the back blade 42 has a sharpened inner edge 46 for engaging the back or opposite side of the tree or pole from the front blade means when in use. As shown, the end portions of back blade 41 are adjustably secured to threaded fasteners 50 which extend through holes in the blade end portions and one of several sets of adjusting holes 47 in the tubular members.

The upper support 60, more particularly shown in FIGS. 7–11, includes a seat 61 and an upper support brace means 75 connected to the seat and engageable with the tree when the occupant is supported thereon.

More particularly shown in FIG. 1 and FIGS. 7–11, the seat 61 is generally rectangular, having front and rear edge portions 62 and 63, a top surface 64, a bottom surface 65 and side edges 66 and 67.

A second V-shaped front angle blade 76 is connected by a pair of spaced blade supports 68 to the seat. The spaced blade supports 68, which are of the same construction as tubular members 44, are secured to the bottom surface 65 of the seat with fasteners 69, which have recessed head portions that are generally flush with the top surface of the seat as shown in FIG. 9. Extending generally perpendicular from the front edge portion 62 of the seat, the projecting end portions of the blade supports 68 are securely attached to the blade with fasteners 70 and position the blade somewhat below and forwardly of the seat, as particularly shown in FIGS. 9 and 10. Provided with a sharpened front or inner edge, the blade 77 is designed to cut or bite into a tree when the weight of a person is disposed on the seat 61.

Upper support or seat brace means 75, being similar to the platform brace means 40, comprises a second V-shaped front blade 76, a second back blade means and a second connecting means which attaches the back blade means to the seat. Having a similar operative behavior as the platform brace means 40, the seat brace means are designed to selectively bite into the front and back of the tree trunk to supportably engage the upper support or seat support 60 at different elevations when the weight of the occupant is generally disposed on the seat 61.

The second connecting means, which adjustably attaches the second blade means to the seat 61, includes bracket means in the form of a pair of spaced angle irons 43 and a second elongated spacer means in the form of a pair of spaced elongated tubular members 78. Connected to the seat 61, particularly shown in FIGS. 9–11, in the same manner as they are connected to the foot platform 21, the angle irons 43 are secured to the side edges 66 and 67 of the seat with threaded fasteners 51.

The triangular arrangement of connection holes 45 on the vertical flanges of the angle irons permit a pivot means 48 to extend through the rearward connection hole and pivotally secure tubular member 78 to the angle iron. By selectively inserting a removable fastener 49 through the tubular member and a remaining connection hole, the tubular member can be angularly positioned with respect to the seat 61. In FIG. 11 the two forward connection holes of the triangular hole arrangement 45 permit the tubular members to be positioned either substantially parallel with the seat or at about 35° from the seat. However, it is contemplated that a plurality of forward connection holes may be employed to permit the pairs of tubular members to be selectively angularly related with the seat. It is also envisioned that an adjustable angular positioning device may be employed to selectively adjust the angular relationship between the various tubular members and the seat within a range of about 25 to 45 degrees.

Formed of the same or similar material as the tubular members 44 and blade supports 68, the tubular members 78 are shorter than the tubular members 44. The ends of the tubular members 78 remote from the seat 61 include pairs or sets of blade adjusting holes 79, wherein the holes 79 are located closer to the pivot means 48 than the corresponding blade adjusting holes 47 of the tubular members 44. The second back blade means in the form of a V-shaped blade 80 provided with a sharpened inner edge 81 is adjustably secured to tubular members 78 by extending threaded fasteners 50 through the blade end portions and one of the pairs of adjusting holes 79.

When it is desired to ascend or descend a tree or pole with tree climbing apparatus, the lower support 20 and the upper support must be operated alternately, as generally shown in FIGS. 3–5. Additionally, FIGS. 1, 2, 4, and 6 illustrate the upper and lower supports disposed in a weight bearing relationship on the tree trunk with the respective brace means 40 and 75 selectively biting into the front and back of the tree trunk to supportably engage the supports at different elevations on the tree.

After a proper tree has been selected, the tree climbing apparatus is unpacked and the pairs of tubular members 44 and 78 are angularly positioned relative to the foot platform and seat respectively. Subsequently, the V-shaped back blades 42 and 80 are adjustably connected to the tubular members 44 and 78 so that the foot platform and seat will be disposed substantially parallel and horizontal when the platform brace means and seat brace means are disposed in a weight bearing relationship on the tree. Additionally, because of the substantially identical angular relationship of the pairs of tubular members with the respective foot platform and seat, the respective elements (e.g. front and back blades and the tubular members) of the platform brace means and seat brace means will be substantially parallel, as is generally shown in FIGS. 1, 2, 4 and 6. With further reference to FIGS. 1 and 2, it is generally seen that the seat 61 is designed to be disposed substantially above the foot engageable means 35 of the foot platform with the distance from the front edge of the front blade 41 to the rear portion of the foot receiving area 23 being substantially equal to the distance from a respective front edge portion of the front blade 76 to the rear edge portion 63 of the seat 61. It is further noted that as a result of the tubular members 44 being longer than the tubular members 78, the distance from the front blade 41 to the pivot means 48 of the lower support will be at least equal to the distance from the front blade 76 to the pivot means 48 of the upper support. The angle irons 43 are connected to the foot platform, adjacent the rear portion of the foot receiving area, to reduce and more evenly distribute the various structural forces (e.g. moment, shear) generated when the weight of the occupant is disposed predominantly on the foot receiving area 23.

Upon securing the supports to the tree, the occupant initially positions himself on the foot support area 24 of the lower platform and then steps between the seat 61 and the tree, as shown in FIG. 2, so that the front blade supports 68 extend between the occupant's legs. In the initial position, as demonstrated in FIG. 2, the upper and lower supports are spaced close together to permit the occupant to removably secure his feet to the foot receiving area 23 with the foot engageable means. The foot engageable means 35, comprising loops 36 and straps 37, movably restrain the feet so that no specific portion thereof, such as the toes, are unduly strained when the foot platform is lifted and lowered during ascent and descent of the tree.

After the occupant has properly positioned himself in the tree climbing apparatus, the occupant may ascend the tree by disengaging the upper support from the tree, as demonstrated in FIG. 3. To disengage the upper support, the applicant positions his hands below the midpoint of the tubular members 78 and straightens his legs, thereby causing the upper support or seat support 60 to be tilted or rotated upwardly about the back blade 80 resulting in disengagement of the front blade 76. Disengagement of the back blade 80 occurs when the seat support 60 is moved slightly toward the tree to remove the blade from a notch formed in the tree when the blade is engaged therewith. Upon raising the seat support 60 a suitable distance, the front blade is repositioned and the seat brace means 75 (also referred to as the upper support brace means) is re-engaged with the tree as the weight of the occupant is disposed on the seat, as demonstrated in FIG. 4.

In FIG. 4 the occupant is disposed on the seat, facing the tree with his knee's spaced apart and straddling the tree trunk. The spacing of the upper and lower supports permits the occupant's legs to be lifted, resulting in a disengagement of the lower support 20 from the tree, as illustrated in FIG. 5. As a result of the foot engageable means 35 firmly engaging the occupant's feet, when the leg's are lifted and the feet are rotated downwardly, the lower support is tilted or rotated upwardly about the back blade 42 causing the disengagement of the front blade 41. Disengagement of the back blade 42 occurs when the lower support 20 is moved slightly toward the tree to remove the blade from a notch in the tree, which is formed when the blade 42 is supportably engaged therewith. Upon raising the lower support a suitable distance, thus reducing the distance between the supports, the occupant's feet are rotated and the legs are lowered to re-engage the platform brace means 40 at the selected elevation. The alternate re-positioning of the upper and lower supports is executed until the occupant has attained the desired elevation on the tree.

Upon reaching the desired elevation, the occupant may either remain seated in the position demonstrated in FIG. 4 or step out of the apparatus, as shown in FIG. 2, and position himself with his back to the tree and his feet resting on the foot support area 24, as illustrated in FIG. 6. Also, the occupant may desire to rotate the upper seat support 60 relative to the lower support 20 so as to permit the occupant to stand unrestrained on the foot platform.

When the occupant desires to descend the tree, he initially repositions himself on the seat with his feet firmly engaged with the foot engageable means. Subsequent thereto, the occupant disengages the lower support 20, lowers his legs and the lower support a sufficient distance, repositions the lower support at the selected elevation and re-engages the platform brace means 40 with the tree. In lowering or raising the foot platform, the feet are rotated downwardly and maintained so that the tubular members 44 are substantially perpendicular to the tree. As a result of the increased space between the blade means on the tree trunk, as demonstrated in FIG. 4, inadvertent engagement of the blade means with the tree is precluded. After the re-positioning of the foot platform, the upper support is disengaged from the tree, as generally shown in FIG. 3, and subsequently re-engaged with the tree at a lower elevation when the weight of the occupant is disposed thereon, as demonstrated in FIG. 4.

Accordingly, the tree climbing apparatus of the present invention incorporates many desirable features. For example, the occupant's legs furnish the primary or sole power required to move the apparatus up and down the tree, with the arm's required merely to lift, lower and reposition the relatively light seat support. As a result, the tree climbing apparatus may be used by children, women and other people who do not have a large degree of upper body muscular development. Further, the substantially horizontal and parallel relationship between the seat and foot platform, when the supports are in a tree engaging position, permits the occupant to more easily sense the occurrence of a proper engagement of the supports with the tree or pole. It is known that a person's sensory perceptions, such as balance, often become distorted at elevated heights and such distortions may become amplified if the seat and foot supports of the present invention were designed to be substantially inclined to each other when the supports are supportably engaged on a tree or pole. The foot platform being supported in a substantially horizontal position allows the occupant to stand thereon with unrestricted movement and field of view. Also, the occupant may rotate the seat support on the tree relative to the foot platform and if desired, he may sit on the seat facing either toward or away from the tree with his feet resting on the foot platform. Furthermore, the substantially parallel relationship between the brace means of the upper and lower supports, when in a tree engaging position, permits the occupant to more readily perceive a proper engagement of the respective blade means with a tree or pole.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A combination tree climbing and seating apparatus for an occupant wherein the occupant's legs furnish the sole power to move the occupant up the tree comprising: a lower climbing support including a foot platform provided with front and back end portions and a top surface extending generally horizontally, platform brace means connected to said foot platform and selectively engageable with the tree when the weight of the occupant is supported thereon, said platform brace means being disengageable from the tree by tilting said lower support upwardly by the occupant, and foot engageable means attached to said top surface adjacent said front end portion for firmly engaging an occupant's feet to allow the occupant to raise or lower said foot platform by lifting the occupant's legs to disengage said platform brace means and lowering the occupant's legs to re-engage said platform brace means on the tree and a climbing upper support including a seat platform having a top surface extending generally horizontally on which an occupant sits with the occupant's back against the tree when said apparatus is used for sitting and facing the tree with the occupant's knees spaced apart and straddling the tree as the occupant's legs are lifted to disengage said platform brace means and lowered to re-engage said platform brace means on the tree during climbing use of said apparatus, seat brace means connected to said seat platform and selectively engageable with the tree when the weight of the occupant is supported thereon, said upper support brace means being disengageable from the tree by tilting said upper support upwardly by the occupant, said platform brace means including a first front blade means connected to said foot platform for engaging the front of the tree, a first back blade means for engaging the back of the tree, and a pair of elongated members disposed on either side of the tree for attaching said first back blade means to said foot platform, said seat brace means including short connecting means located generally medially of and extending away from said seat platform and towards the tree to dispose said seat platform spacedly outwardly from the tree, said seat brace means further including a second front blade means connected to said short connecting means for engaging the front of the tree, a second back blade means for engaging the back of the tree, and a pair of elongated members disposed on either side of the tree for attaching said second blade means to said seat platform, said seat platform being disposed above said foot platform substantially above said foot engageable means when said platform brace means and said upper support brace means are disposed in weight bearing relationship on the tree truck, said foot platform pair of elongated members being longer than said seat platform pair of elongated members, said seat platform terminating generally medially of said foot platform, said short connecting means being sufficiently short to minimize the spaces on either side of said short connecting means and the respective said elongated members of said upper support for the occupant's legs during climbing and descending and to maximize the available foot room on said foot platform for the occupant during sitting of the occupant on said seat platform with the occupant's back to the tree when said apparatus is used for sitting of the occupant.

2. The tree climbing apparatus according to claim 1 wherein said lower support and said upper support are substantially parallel when said platform brace means and said seat brace means are disposed in weight bearing relationship on the tree trunk.

3. The tree climbing apparatus according to claim 1 wherein said top surfaces of said foot platform and said seat platform are substantially parallel when said platform brace means and said seat brace means are disposed in weight bearing relationship on the tree trunk.

4. The tree climbing apparatus according to claim 1, wherein said platform brace means and said seat brace means are substantially parallel when said platform brace means and said seat brace means are disposed in weight bearing relationship on the tree trunk.

5. The tree climbing apparatus according to claim 1 wherein said platform brace means is substantially parallel to said seat brace means and said foot platform top surface is substantially parallel to said seat platform top surface when said platform brace means and said seat brace means are disposed in weight bearing relationship on the tree trunk.

6. A combination tree climbing and seating apparatus wherein the occupant's legs furnish the motive power to move the apparatus up the tree comprising, a lower support including a foot platform provided with front and rear end portions and a top surface extending generally horizontally, platform brace means including front and back blades connected to said foot platform for selectively biting into the front and back of the tree trunk to supportably engage said foot platform at different elevations on the tree, foot engageable means extending from said top surface adjacent said front end portion for firmly engaging an occupant's feet to allow the occupant to raise or lower said foot platform by lifting and lowering the occupant's legs to respectively disengage and re-engage said platform brace means at selected elevations on the tree, said platform having a foot support area disposed rearwardly of said foot engageable means adjacent said back end portion for permitting the occupant to stand thereon, a seat support including a seat platform having a top surface extending generally horizontally on which an occupant sits with the occupant's back against the tree when said apparatus is used for sitting and facing the tree with the occupant's knees spaced apart and straddling the tree trunk as the occupant's legs are lifted to disengage said foot platform brace means and lowered to re-engage said platform brace means at a different elevation below said seat support during climbing use of said apparatus, seat brace means including short connecting means located generally medially of and extending away from said seat platform and towards the tree, said seat brace means further including a front blade connected to said short connecting means and a back blade connected to said seat support for selectively biting into the front and back of the tree trunk to supportably engage said seat support at different elevations on the tree, said seat brace means being disengaged from the tree trunk as said seat support is tilted upwardly and re-engaged with the tree as the weight of the occupant is disposed on said seat platform, said seat platform being disposed spaced away from the tree and generally above said foot engageable means when said foot platform brace means and said seat brace means supportably engage the tree to enable an occupant to sit on said seat platform with the occupant's back to the tree and the occupant's feet disposed on said foot support area when said apparatus is used for sitting by the occupant.

7. The tree climbing apparatus according to claim 6 wherein said top surfaces of said foot platform and said seat are substantially parallel when said platform brace means and said seat brace means supportably engage the tree.

8. The tree climbing apparatus according to claim 6 wherein said platform brace means and said seat brace means are substantially parallel when said platform brace means and said seat brace means are supportably engaged with the tree.

9. The tree climbing apparatus according to claim 6 wherein said foot platform includes a foot receiving area cooperating with said foot engageable means to secure the occupant's feet thereto, and the distance from said front blade of said platform brace means to a rear portion of said foot receiving area is substantially equal to the distance from said front blade of said seat brace means to a rear terminating portion of said seat platform.

10. The tree climbing apparatus according to claim 9 wherein said foot platform and said seat platform are substantially parallel when said platform brace means and seat brace means are disposed in weight bearing relationship on the tree.

11. The tree climbing apparatus according to claim 6 wherein said platform brace means includes a pair of spaced elongated members disposed on either side of the tree and being securely attached to said back blade of said platform brace means and a pair of bracket means respectively attaching said elongated members to said foot platform, and the distance from said front blade of said platform brace means to said bracket means is at least equal to the distance from said front blade of said seat brace means to a rear terminating end of said seat platform.

12. The tree climbing apparatus according to claim 11, wherein said foot platform and said seat platform are substantially parallel when said platform brace means and said seat brace means are disposed in weight bearing relationship on the tree trunk.

13. The tree climbing apparatus according to claim 11 wherein said seat platform is disposed substantially above said bracket means when said platform brace means and said seat brace means are disposed in weight bearing relationship on the tree trunk.

* * * * *